United States Patent [19]

Colchagoff

[11] 3,723,084
[45] Mar. 27, 1973

[54] METHOD AND APPARATUS FOR BLENDING MOLTEN GLASS

[75] Inventor: Robert D. Colchagoff, Toledo, Ohio
[73] Assignee: Owens-Illinois, Inc.
[22] Filed: May 7, 1971
[21] Appl. No.: 141,305

[52] U.S. Cl. .................65/136, 65/178, 65/328, 65/346
[51] Int. Cl. .................C03b 5/18, C03b 5/32
[58] Field of Search........65/136, 347, 178, 346, 180, 65/328, 325; 259/7, 8

[56] References Cited

UNITED STATES PATENTS

| | | | |
|---|---|---|---|
| 3,328,150 | 6/1967 | Rough | 65/178 |
| 3,427,142 | 2/1969 | LaJarte | 65/99 A |
| 3,378,246 | 4/1968 | Leding | 259/7 |
| 2,431,478 | 11/1947 | Hill | 65/178 |
| 2,654,184 | 10/1953 | Peiler | 65/180 |

Primary Examiner—S. Leon Bashore
Assistant Examiner—Kenneth M. Schor
Attorney—D. T. Innis and E. J. Holler

[57] ABSTRACT

In a preferred embodiment of the invention described herein there is disclosed a method for thoroughly mixing molten glass flowing in a refractory receptacle. A stirring means is immersed in the molten glass with molten glass engaging and circulating means disposed closely adjacent the wall means of the receptacle. Protective shielding is interposed between the stirring means and the refractory of the receptacle to prevent erosion of the refractory. The stirring means is driven to remove relatively viscous and cooler molten glass from adjacent the wall means to mix and blend such gas with hotter, less viscous glass away from the wall means of the receptacle. In the preferred embodiments shown the stirring means is disposed closely adjacent a bottom wall of the protective. A pool of protective fluid having a density greater than the molten glass is retained between the stirring means and the refractory of the receptacle. The pool of protective fluid is preferably a molten metal which has a boiling temperature higher than the temperature of the molten glass. A layer of material is interposed between the pool and the refractory to retain the pool in protective disposition between the stirrer and the refractory.

24 Claims, 3 Drawing Figures

INVENTOR
ROBERT D. COLCHAGOFF

BY
ATTORNEYS

INVENTOR
ROBERT D. COLCHAGOFF

BY
ATTORNEYS

METHOD AND APPARATUS FOR BLENDING MOLTEN GLASS

BACKGROUND OF THE INVENTION

The present invention relates broadly to the art of glass manufacture. More particularly, the present invention relates to a novel method and apparatus designed to provide an optimum degree of blending and mixing of the molten glass as it is conveyed in a forehearth, channel, or the like, and as it is fed to and from glass feeding apparatus connected to a forehearth to receive molten glass.

It is generally recognized that molten glass as it is being conveyed from a glass melting tank to the forming machine is possessed of a fair degree of inhomogeneity or inconsistency. This defective condition is due to several phenomena. One constitutes the chemical reaction taking place in the melting operation involving the mutual dissolution of different silicates in each other, which reactions give off by-products productive of such defects. Another cause of inconsistencies involves the foreign impurities present in normal batch ingredients. Additionally, the temperature conditions may vary within the flowing stream of glass due to the cooling effect caused by contact of the peripheral portions of the flowing stream with the refractory constituting a channel body resulting in heat loss. It is desirable that these inhomogeneities and discontinuities, which are frequently referred to as seeds, stones, striae, mares tails, and the like, be eliminated by efficient blending, homogenization or mixing, as these operations are referred to generally in the art.

Mixing and/or blending is also resorted to in order to achieve an intimate and complete distribution of added coloring oxide in the molten glass in order that the coloration of the molten glass by the time it reaches the delivery or forming end of the forehearth or channel will be substantially uniform.

Various methods and apparatus for achieving mixing, blending, or homogenization have been resorted to in the past, and though advances have been made most methods and apparatus still have certain shortcomings ranging from incomplete mixing to too violent a mixing whereby the various defects, which are intended to be eliminated, are in fact exaggerated and increased.

Similar problems occur with respect to glass feeding apparatus connected to receive molten glass from a forehearth. Modern demands for better quality in glass containers and also for lighter, thinner walled containers require better mold charges fed to the forming machine. These mold charges should have greater uniformity and accuracy of weight, shape, temperature and temperature distribution as the demands for quality increase.

The glass supplied by the melting furnace to such feeding apparatus generally has to be cooled to bring it to the desired temperature for the mold charges, but sometimes it has to be raised in temperature. In cooling the glass as it passes through the forehearth, some of it is over cooled and some of it is under cooled. Similarly, in heating it, some of it is over heated and some of it is not heated enough. In each instance the average temperature of the glass as it approaches the feed chamber may be generally that desired, but there may also be temperature differences above and below a desired temperature. This effect is influenced by a greater resistance to viscous flow along the sides and bottom of the forehearth or the feeding receptacle and by the cooling influence of such sides and bottom. The glass on top and in the center of both the forehearth and feeder flows faster than that of the sides and bottom, and there is most generally a considerable difference in temperature between the glass at the top and the center than that at the sides and bottom. These temperature differences cause differences in temperature in the mold charges which are fed.

It is well known that mold charges formed and severed in suspension form this type of apparatus have an outer skin which while hot and plastic is still substantially colder than the interior of the mold charge. This skin is rendered colder and thicker by the colder, more viscous glass which travels more sluggishly along the bottom and sides of the forehearth, and particularly of the bottom of the feed chamber. This colder glass forms a lining for the bottom of the feed chamber and flows to form the outside of the mold charges, exaggerating the cold skin condition.

It can thus be seen from the above discussion that it is desirable to more thoroughly blend and mix the glass flowing along a forehearth and in a feeder to minimize differences in temperature, viscosity and homogeneity throughout the body of molten glass. Moreover, although slight temperature differences can be more readily tolerated with respect to the glass adjacent the side walls, the more viscous glass creeping along the bottom walls will flow directly into the bottom of the feed chamber and be formed into discrete gobs much more readily than that from the side walls.

In attempting to more thoroughly blend and mix molten glass, glass flow currents in a molten body are sometimes induced by a stirring means that have a magnitude and direction sufficient to erode, wear or otherwise damage refractory or other wall means retaining the molten body and susceptible to currents of a predetermined magnitude and direction. Moreover, in order to move and circulate the viscous and/or inhomogeneous glass adjacent the retainer walls it is desirable to place the glass engaging and circulating elements of a stirrer very closely adjacent a wall. This has presented problems with respect to physically locating the stirrers in the molten glass and also exaggerates the wall wear from induced currents.

Accordingly, it is an object of this invention to provide an improved method and apparatus for mixing a body of molten glass.

It is a further object of this invention to provide an improved method and apparatus for blending molten glass in forehearths, feeders or combinations of forehearths and feeders.

It is another object of this invention to provide an improved method and apparatus which is particularly effective in mixing the more viscous glass along the bottom and to improve the mixing of the viscous glass along the sides of molten glass retaining means, to minimize differences in temperature, viscosity and homogeneity before the glass is finally fed to its end use.

It is a still further object of this invention to provide an improved method and apparatus for conveying and feeding molten glass which is operative to provide thoroughly blended molten glass at a greater rate than heretofore possible.

It is particular object of the present invention to provide improved forehearth constructions and feeding chamber constructions which provide an improved efficiency in blending molten glass while reducing the maintenance required.

It is still another object of this invention to provide a method and apparatus for thoroughly mixing molten glass flowing in a refractory receptacle while avoiding the refractory erosion problem which accompanies the best previous mixing techniques.

SUMMARY OF THE INVENTION

In carrying out the novel principles of this invention there is featured apparatus for blending molten glass which includes means for retaining a body of molten glass having wall means susceptible to damage by glass flow currents having a predetermined direction and magnitude. Molten glass stirring means operable to minimize differences in temperature, viscosity and homogeneity throughout the body of molten glass is used to effect these functions by inducing glass flow currents in the body to blend the glass. The portions of the susceptible wall means exposed to the induced flow currents having damaging directions and magnitudes are shielded to enable a thorough mixing of the molten glass by the stirring means. The shielding means may comprise a metal means inset in the exposed wall portions. The stirring means may have a shaft or leg support extending beyond the body of molten glass to be received by the inset enabling maximum stirring influence on the molten glass adjacent the inset and thus on the exposed wall portion.

The wall means may include bottom wall means having a cavity formed therein adjacent the stirring means. The shielding means may then include a fluid having a greater density than the molten glass, the fluid being contained in the cavity against movement with the currents of molten glass. Fluid container means may be disposed in the cavity to contain the fluid in the cavity and isolate the fluid from the wall means.

The fluid means may comprise a molten metal, with the preferred fluid being molten tin. The stirring means may then include means extending into the molten tin enabling maximum stirring influence on the molten glass adjacent the bottom wall.

The bottom wall means may include a feeder orifice means and the cavity may be formed with an annular configuration around the feeder orifice means to retain the molten metal or other high density fluid. The stirring means for the heating apparatus may include a structure having the lower end thereof disposed in the fluid and the other extending out of the molten body of glass for connection to a driving means to rotate the structure. The lower end of the stirrer structure for the feeder apparatus may be generally annular and have openings formed therein which extend upwardly from adjacent the fluid to admit glass exterior of the structure to the feeder orifice while stirring the glass during rotation of the structure. Alternately, a plurality of stirring segments or legs may extend upwardly from adjacent the fluid to be rotated about the orifice to blend the glass proceeding to the feeder orifice.

Other objects of this invention will become apparent when the following description is taken in conjunction with the accompanying drawing, in which.

DESCRIPTION OF THE PREFERRED EMBODIMENTS

Figure 1:
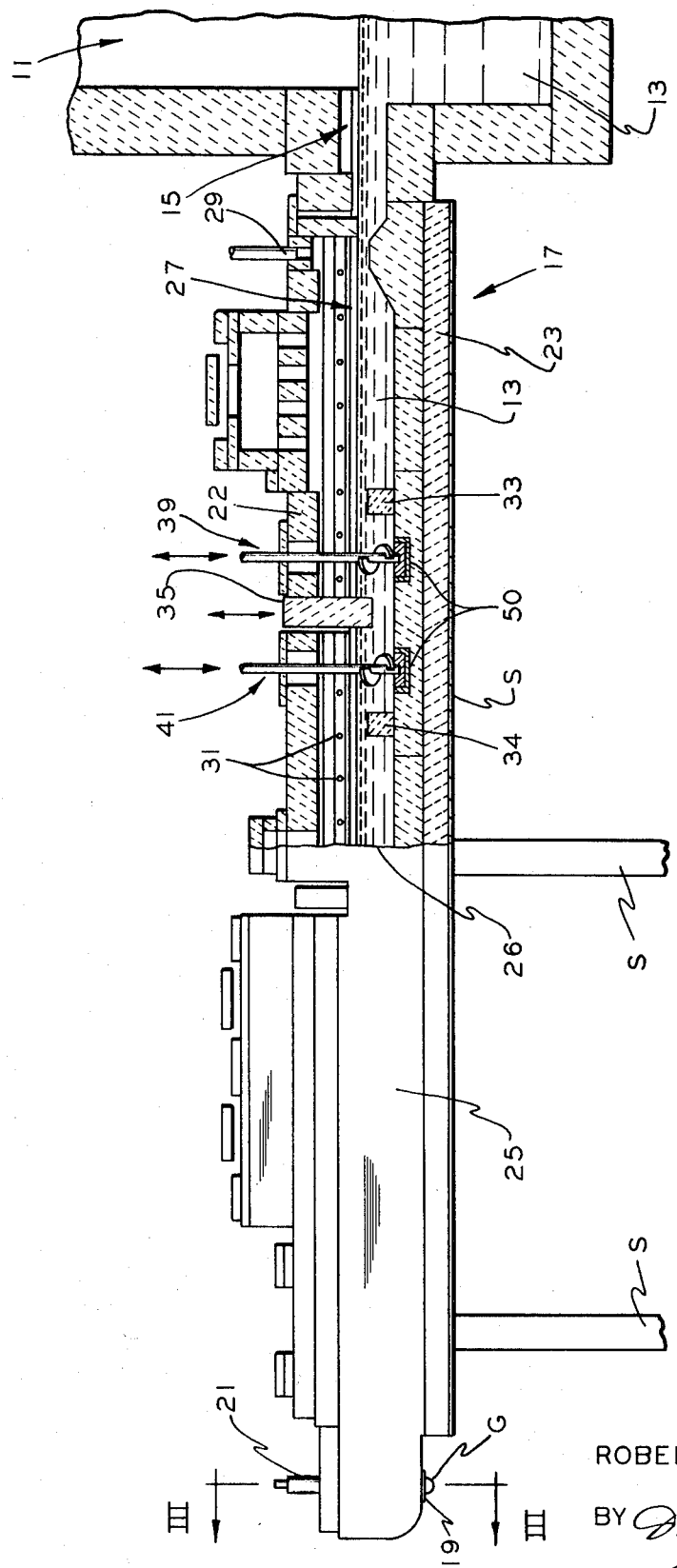
FIG. 1 is a longitudinal elevation view of a furnace tank and forehearth, partly in section illustrating one embodiment of the present invention.

There is shown in FIG. 1 a glass melting tank 11 containing a mass of molten glass 13 to a depth such that it flows laterally through an opening 15 in the side vertical wall of the glass melting tank 11. The glass 13 upon flowing through the opening 15 passes into the forehearth channel 17 resting on support members S, from which forehearth the molten glass flows out the opening 19, as controlled by a vertically reciprocable plunger 21 adapted to release a gob G of molten glass as desired by the forming operation. It will be appreciated that the forehearth 17 as described hereinafter may be utilized to convey molten glass to other glass forming operations, and that a gob forming operation is illustrated herein for the sake of simplicity and because the invention is also particularly applicable thereto.

The forehearth 17 includes a bottom wall composed of a refractory which is normally resistant to the molten glass and also insulative in character. The forehearth channel 17 also includes refractory top wall 22 and side walls 25, one side wall 25 being broken away as at 26 in order to show the interior of the forehearth 17 and the structural modifications and stirrer arrangements of the invention in the forehearth. The bottom and side walls define an elongated chamber 27 which encloses and defines the path of the molten glass in its lateral passage therethrough.

As the molten glass 13 passes from the opening 15, it passes beneath a supply tube 29 which is connected to a vari-feed supply hopper, not shown, which may contain a supply of colorant in granular form which is allowed to fall into the molten glass. Gas firing burners 31 project a flame laterally across the top of the molten glass to control the temperature within the forehearth channel.

A pair of channel traversing dam members 33 and 34 may be located on the bottom wall 23 in upstanding spaced parallel relationship. Additionally, provision may be made for a vertically adjustable depending skimmer bar 35 to project downwardly beneath the level of the flowing glass 13. The skimmer bar 35 may be located generally midway between the dam members 33 and 34 and define two spaced zones 37 and 38 on either side of the skimmer bar 35. Into each of these zones or compartments 37 and 38 there is positioned respectively vertically shiftable stirrer members 39 and 41. The stirrer 39, for example, is composed of a circular or cylindrical shaft 39a, about which is wrapped for one full turn a spiral blade or fin elements 39b.

Located below each stirrer means is a protective shielding means indicated at 50. The shielding means 50 is preferably inset into the bottom wall of the forehearth channel to prevent interference with desired glass flow through the channel and to enable disposition of the spiral blade or fin elements as closely as possible to the nonuniform layer of glass flowing along the bottom of the channel.

Figure 2:
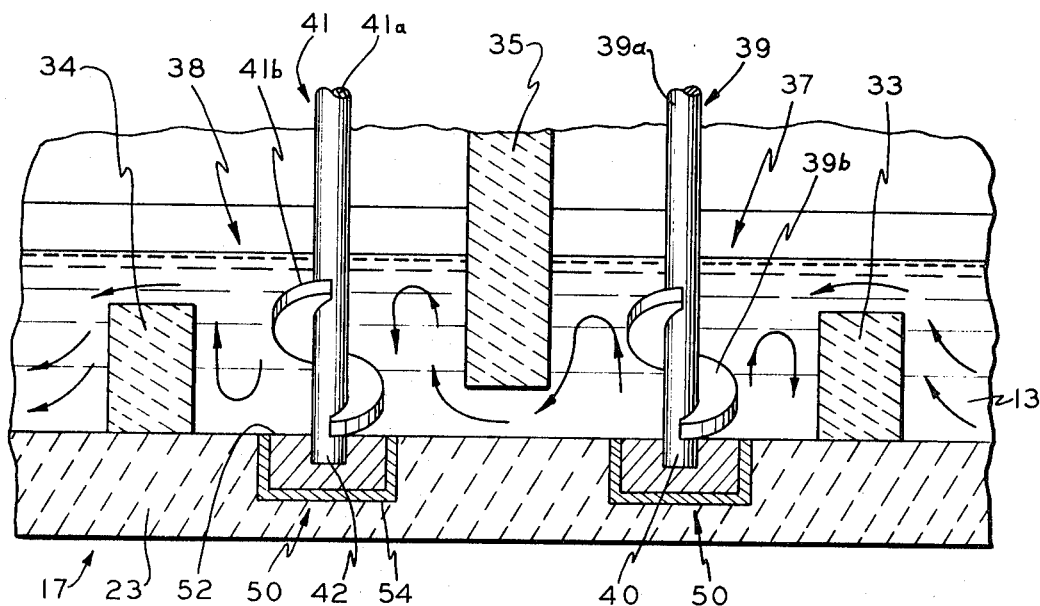
FIG. 2 is an enlarged view of one segment of the forehearth illustrated in FIG. 1.

In the construction shown in FIGS. 1 and 2 the stirrer 39 may be rotated in a clockwise direction while the stirrer 41 is rotated in the counterclockwise direction. Thus the glass path is first generally horizontal, then proceeds up and over the dam member 33 and down into compartment 37, where the glass is contacted by the stirrer 39 rotating clockwise in such fashion that the spiral blades induce current flow and urge the glass upwardly, impeding the normal flow of the glass downwardly and laterally beneath the skimmer 35. The path then leads into the compartment 38 for the contact of the glass by the stirrer 41 whose rotation is counterclockwise in such fashion that the glass is urged downwardly from its normal flow pattern up and over the dam member 34 from which it proceeds laterally downstream from the delivery end.

Before the development of the principles disclosed in this invention the speed of rotation of the stirrers 39 and 41 was limited. It was found that the current flow induced by the stirrers 39, 41 had an eroding effect upon the refractory, particularly in the bottom wall 23 directly below the stirrers 39, 41. Since the glass flow is directed downwardly by the stirrer 41, molten glass currents induced by the stirrer 41 have a magnitude and direction directly at the bottom wall which are sufficient to erode the bottom refractory wall 23 and form a substantial hole or cavity in the floor. The formation of the hole or cavity below the stirrer means 41 not only structurally weakens the forehearth channel but degrades the thermal characteristics thereof from a desired known set of characteristics, and sometimes actually increases the nonuniformity and inhomogeneity of the molten glass body in the channel.

While the erosion problem is not quite of the same magnitude beneath the stirrer means 39 which is directing glass upwardly from the forehearth bottom wall, there is nontheless erosion adjacent the bottom end of the stirring means 39. The glass flowing down in a current in order to be fed into the upwardly directed stream flow induced by the stirrer 39, hits the bottom wall with a magnitude and direction of flow which can cause erosion.

Thus the speed of rotation of both stirrers 39 and 41 was limited in the prior art. Moreover, the spacing of the stirrers 39 and 41 and of their spiral blades or fin elements from the bottom wall of the channel was required to be at a predetermined distance to prevent erosion of the refractory channel. Therefore, a layer of relatively viscous, inhomogeneous glass along the bottom of the channel was able to avoid the action of the stirrers because of the rotational speed limitations and the spacing limitations.

In the present invention shielding means indicated at 50 have been interposed between the bottom of the stirrers 39, 41 and refractory of the bottom wall 23. The inset shielding means 50 may be a metal or other material which has a melting point higher than the temperature of the molten glass in the forehearth and which will resist the erosion of the induced current flow from the stirrers 39 and 41. It has been found preferable however, to utilize a fluid as indicated at 52 which has a density greater than that of the molten glass. The fluid 52 may be retained in a container 54 set in the cavity formed in the forehearth bottom wall to retain the fluid and isolate the fluid from the refractory wall 23.

Such a fluid having density greater than molten glass and having a melting point below and a boiling point above the temperature range for molten glass is molten tin. Other suitable fluids having the required density to maintain them in the cavity may be used as long as the fluid selected has a melting point such that it is in a fluid or liquid condition at the operating temperature adjacent the channel or feeder. Metals or metal alloys are desirable that do not react in an undesirable manner with the molten glass composition.

The stirrers 39, 41 have shaft portions 40, 42 extending past the spiral fin or glass circulating elements on the shafts so that the shaft portions 40, 42 are immersed in the molten metal or fluid 52. Thus, the molten metal 52 may act as a bearing means which receives and restrains vibratory motion of the end of the shafts 40, 42 with respect to the molten glass. The density of the molten metal is substantially higher than that of the molten glass. The relatively much higher density of the fluid 52 affords some control over the lower end of the stirrers shown in FIGS. 2 and 3, by resisting vibratory or eccentric motion which may be imparted to the stirrers by their driving means or by the resistance of the molten glass pushing on the glass circulating elements.

With an arrangement of the nature illustrated in FIG. 2, the spiral blade or fin elements 39b and 41b can be wrapped around the shafts 39a, 41a and terminate adjacent or just above the molten metal 52 enabling the spiral blade or fin elements to reach and agitate the layer of viscous and inhomogeneous molten glass adjacent the bottom wall of the forehearth. Thus, the present invention not only enables increased speed of rotation of the shafts 39, 41, but the viscous, inhomogeneous layer adjacent the bottom wall may be directly contacted and agitated to insure a thorough and uniform blending and mixing of the molten glass body in the forehearth 17.

Since there is no regularly sized bearing hole for receiving the shaft portions 40, 42 in he molten metal high density fluid 52, as there would be with respect to a solid shield interposed between the stirrers 39, 41 and the bottom wall 23, there is no difficulty in replacing the stirrer elements, 39, 41 when they become worn or otherwise require maintenance. That is, the stirrers 39, 41 may be lifted out and replaced with the substitutes therefore being readily physically located in their position with the lower shafts thereof immersed in the molten fluid without a centering problem.

Since there is no wear or erosion of the refractory bottom wall during operation of the stirrer, the level of the dense fluid stays at that originally determined. The withdrawal of a stirrer and replacement thereof by another stirrer presents no problems in trying to physically locate the bottom leading edge of the spiral blade or fin elements closely adjacent the bottom of the forehearth channel 17 to agitate the viscous and homogeneous layer next to the bottom. Thus it can be seen that the use of a very dense fluid as a shield enables maintenance work on and replacement of stirrers with no reduction in efficiency while the glass manufacturing operation continues.

Figure 3:
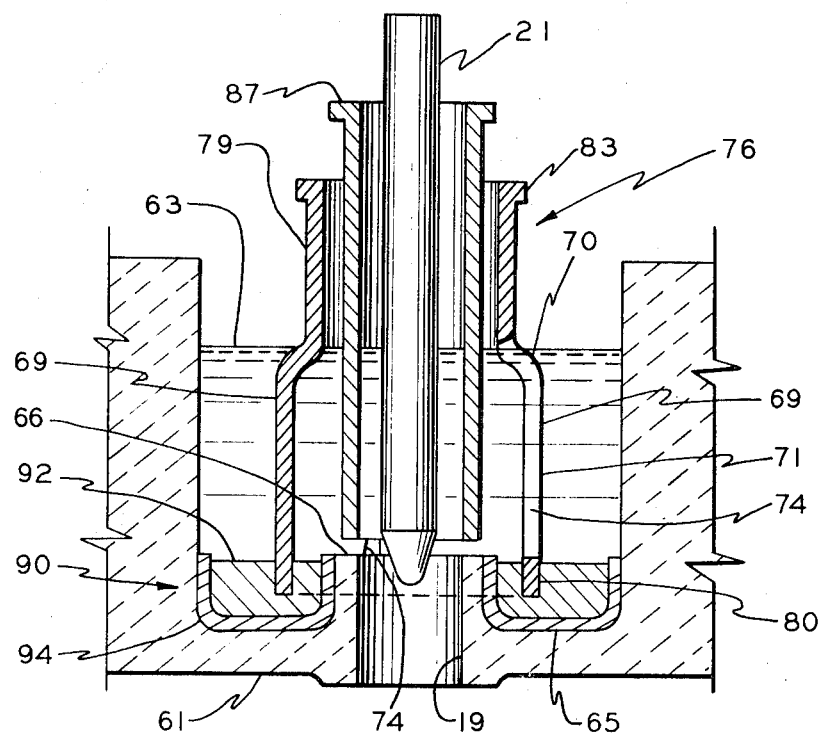
FIG. 3 is cross-sectional view of a feeder apparatus section taken along lines III—III of FIG. 1.

Referring now to FIG. 3 the invention is illustrated in use with glass feeding apparatus. The cross-sectional view taken along line III—III of FIG. 1 of the glass feeding apparatus connected to the forehearth channel 17 shows a refractory glass discharge or feed bowl 61 which is operably joined to the refractory forehearth channel 17, FIG. 1, so that molten glass from the supply and melting tank furnace 11 may flow through the channel into the feed bowl to fill the latter to a predetermined level indicated at 63. The feeder bowl 61 has suitable cover structure and burner heating provisions, not shown, which are well known to those skilled in the art. The feed controlling provisions of the feeder shown in FIG. 3 has the separate but coordinated functions of controlling weight and shape of the glass charges fed, and of circulating and blending all glass en route to the feeder outlet or outlets to assure desirable uniformity of temperature, viscosity and condition of the glass arriving at the outlet or outlets.

The feed bowl is made of refractory material which is glass resistant under normal condition and may be made in one piece as shown. In some applications the feed bowl is made from two pieces, one forming the main body of the bowl and the other one consisting of an especially glass-resistant insert or bushing. This permits the body of the bowl to be made of a more suitable material to resist heat shock, and also permits the bushing which forms the discharge well, in which the lower end of the plunger 21 acts, to be made of a more highly glass-resistant material which would not be so suitable for heat shock. Since this invention is particularly directed to the preservation of the interior of the feeder bowl against damage, erosion or other wear as the result of the stirring action, the feeder bowl is shown as a one piece construction for purposes of simplicity.

In either the one piece or two piece feed bowl construction the feed bowl may be said to have a tubular output member, having the outlet passage 19 formed therein, in its bottom projecting upwardly into the glass in the feed bowl above the level of the adjacent surface 65 of the feed bowl bottom in the form of an annular curb 66 around the upper end of the vertical outlet passage 19.

As hereinafter will become clear, the novel arrangement of glass homogenizing and feed control components of the feeder apparatus illustrated in FIG. 3 provides a commercially practical separation of the three important functions of charge weight control, charge shape control, and circulation of the glass in the bowl toe effect thorough blending and equalization of temperature of all parts of the glass passing through the discharge orifice or orifices. This is accomplished without undesirable change of level of the glass in feed bowl and so as to prevent accumulation of relatively colder, more viscous or stagnant glass on the floor of the bowl around the discharge passage. Consequently the glass fed downwardly through the feed orifice or orifices tends to be more uniform in temperature throughout its cross-section and to have less thickness of cold glass or "skin" on its periphery next to a glass discharge passage or orifice wall. These results all aid better control of weight, shape and condition of glass charges obtained by feed of glass from the bowl.

A rotary member 76 comprises a plurality of cooperative segmental sections, three in the example shown. Each of the segmental sections consists of an outwardly flaring portion 70 and a relatively narrower lower portion 71 which in the apparatus of FIG. 3 is disposed substantially vertically. The portions 70 of each segment are joined to a cylindrical upper portion 79 of the rotary member 76, while the lower portion 71 of the segments is joined to an annular ring 80. Thus the segments 69 are arranged in a circle around the discharge passage 19 on the annular ring 80 and extend upwardly through the molten glass for connection to the cylindrical upper portion 79. The segments or legs 69 thus also define openings or slots 74 in the stirrer 76 to admit glass exterior of the stirrer through to the discharge passage 19. The upper portion 79 of the rotary member 76 may have an external flange 83 formed to fit in a suitably configured seat of a rotary driving means, not shown.

The action of the rotor effects desirable circulation and blending of glass in the bowl on its way to the outlet. When a rotor 76 is in an operative position the lower glass engaging segments, legs or prongs 69 extend from above the glass surface 63 to a level below that of the curb 66 surrounding the upper end of the glass outlet flow passage 19.

The stirring legs 69 of the rotor 76 also cooperate with the side wall of the feed bowl and with a flow regulating sleeve or tube 87 to circulate the glass in the bowl in a generally spiral path so as to thoroughly bend and equalize the temperature of the glass passing through the annular space between the bottom end of the regulating sleeve 87 and the curb 66 to the feed bowl outlet. The circulating glass passes into the space between the rotor legs 69 and the regulating sleeve 87, the sleeve 87 being concentric with and spaced inwardly from the rotor 76.

The plunger 21 is supported in a central position within the sleeve 87 so that its lower end depends into the well or outlet passage 19. The plunger 21 is reciprocated vertically to impart desired accelerative and retractive impulses to the glass in the outlet passage 19 to aid the formation of and for the control of the shape of the issuing charges. Means to adjustably support and reciprocate the plunger 21 are known to those skilled in the art and will not be described in detail herein.

A means for shielding the bottom and lower side walls of the feeder bowl is indicated generally at 90 and comprises in this embodiment a fluid 92 which is more dense than the molten glass and a container 94 interposed between the fluid and the refractory of the feed bowl 61 to retain the fluid in its operative position and to isolate the fluid from the refractory. As noted hereinbefore with respect to the apparatus illustrated in FIGS. 1 and 2, the fluid 92 is preferably a molten metal such as molten tin.

The lower end of the rotor 76 is preferably immersed in the fluid 92. The depth of the immersion is such so that the annular ring 80 just extends out of or above the level of the fluid 92. The agitating or mixing legs 69 will then extend upwardly from the surface of the shielding fluid and be operative to mix the molten glass from the upper surface thereof to the lowermost surface thereof adjacent the molten metal 92. With this arrangement, the stirring action of the rotor 76 is effective entirely to the bottom of the body of glass in the feeder bowl 61 around the curb and prevents accumulation thereof the relatively colder, viscous and stagnant glass which otherwise would lie next to the bowl floor. The glass layer adjacent the protective fluid is impelled upwardly into and mixed with the hotter glass. If homogenization of the molten glass body in the feeder apparatus is required to complete mixing of coloring materials or to remove any other inhomogeneities, the apparatus illustrated in FIG. 3 is operative to complete the required homogenization, in addition to removing the colder, viscous layer adjacent the bottom of the feeder bowl 61 which tends to creep into the outlet 19 to form the undesirable skin.

The provision of the shielding means 90 at the bottom and along the lower side walls of the feeder apparatus in FIG. 3 permits the selection of a desired speed of rotation of the rotor 76 for most effective mixing without fear of inducing glass flow currents which will damage the lower or side walls of the feeder bowl 61. The rotary member 76 may be removed and replaced while the glass manufacturing process is in operation, since the level of the protective fluid 92 will remain the same to permit the accurate positioning of the legs 69 with respect to the bottommost surface of the body of molten glass in the feeder bowl 61.

It should also be noted that although it is advantageous for the stirring means 76 to have its lower annular end immersed in the fluid 92, that the shielding and improved mixing principles of this application apply if the lower annular ring 80 of the stirrer 76 were removed so that the legs 69 terminate just at the surface of the fluid 92. The lowest level of viscous glass may be mixed with the remaining glass while the erosion of the refractory is prevented by the shielding means 90.

As various changes may be made in the form, construction and arrangement of the parts and of the steps of the method without departing from the spirit and scope of the invention and without sacrificing any of its advantages, it is to be understood that all matter herein is to be interpreted as illustrative and not in a limiting sense.

I claim:

1. Apparatus for blending molten glass, comprising
   a. means for retaining a body of molten glass having wall means susceptible to damage by glass flow currents having a predetermined direction and magnitude,
   b. molten glass stirring means operable to minimize differences in temperature, viscosity and homogeneity throughout the body of molten glass by inducing glass flow currents in the body to blend the glass, and
   c. means directly below said stirring means and interposed between said induced glass flow currents and the damageable portion of said susceptible wall means for shielding the portions of said susceptible wall means exposed to induced flow currents having damaging directions and magnitudes, to enable the thorough mixing of said molten glass by said stirring means.

2. Apparatus as defined in claim 1 in which said shielding means comprises metal means inset in said exposed wall portions.

3. Apparatus for blending molten glass, comprising
   a. means for retaining a body of molten glass having wall means susceptible to damage by glass flow currents having a predetermined direction and magnitude,
   b. molten glass stirring means operable to minimize differences in temperature, viscosity and homogeneity throughout the body of molten glass by inducing glass flow currents in the body to blend the glass, and
   c. means for shielding the portions of said susceptible wall means exposed to induced flow currents having damaging directions and magnitudes, to enable the through mixing of said molten glass by said stirring means,
   d. said shielding means comprising metal means inset in said exposed wall portions,
   e. said stirring means extending beyond said body of molten glass and received by said inset enabling maximum stirring influence on the molten glass adjacent said inset by the placement of stirring elements closely adjacent the exposed wall means.

4. Apparatus for blending molten glass, comprising
   a. means for retaining a body of molten glass having wall means susceptible to damage by glass flow currents having a predetermined direction and magnitude,
   b. molten glass stirring means operable to minimize differences in temperature, viscosity and homogeneity throughout the body of molten glass by inducing glass flow currents in the body to blend the glass, and
   means for shielding the portions of said susceptible wall means exposed to induced flow currents having damaging directions and magnitudes, to enable the thorough mixing of said molten glass by said stirring means,
   d. said wall means including bottom wall means having cavity means formed therein adjacent said stirring means,
   e. said shielding means including a fluid having a greater density than said molten glass, said fluid being contained in said cavity means against movement with said molten glass.

5. Apparatus as defined in claim 4 which further includes fluid container means in said cavity means for containing said fluid in said cavity.

6. Apparatus as defined in claim 4 in which said fluid means comprises a molten metal.

7. Apparatus as defined in claim 4 in which said fluid comprises molten tin.

8. Apparatus as defined in claim 4 in which said stirring means includes means extending into said fluid enabling maximum stirring influence on the molten glass adjacent said bottom wall means by the placement of stirring elements closely adjacent the bottom wall.

9. Apparatus as defined in claim 4 in which
   a. said bottom wall means includes feeder orifice means, and in which
   b. said cavity means includes an annular configuration formed around said feeder orifice means.

10. Apparatus as defined in claim 9 in which said stirrer means includes a structure having the lower end thereof disposed in said fluid and the other end extending out of said molten body of glass for connection to a driving means to rotate said structure.

11. Apparatus as defined in claim 10 in which the lower end of said stirrer means is generally annular and in which legs are formed which extend upwardly from adjacent said fluid to admit glass therebetween from exterior of said stirrer means to said feeder orifice means while stirring said glass during rotation of said stirrer means.

12. Molten glass conveying and mixing apparatus, comprising
   a. forehearth means including a bottom wall of refractory material and connected upstanding side walls defining an elongated channel,
   b. a plurality of rotatable stirrers disposed along said forehearth at least one of which induces downwardly directed molten glass flow to blend the molten glass being conveyed, and
   c. shielding means directly below each stirrer which directs glass flow downwardly for protecting said bottom refractory wall from erosion.

13. Apparatus as defined in claim 12 in which
   a. said shielding means includes a fluid heavier than glass contained in a cavity formed in said bottom wall, and in which
   b. each said stirrer adjacent said fluid includes a lower end extending into said fluid and a stirring element above and closely adjacent the surface of said fluid for moving the molten glass adjacent the bottom wall of the forehearth into mixing contact with other molten glass flowing in said forehearth.

14. Apparatus as defined in claim 13 in which each said stirrer adjacent said fluid comprises
   a. a shaft having the bottom end immersed in said fluid, and
   b. a spiral fin starting closely adjacent the surface of said fluid and wrapping upwardly around said shaft.

15. Apparatus as defined in claim 13 in which each said stirrer comprises,
   a. an annular ring immersed in said fluid, and
   b. a plurality of vertically disposed segmental sections arranged around said annular ring, connected to said annular ring above said fluid, and extending upwardly therefrom.

16. Glass feeding apparatus, comprising
   a. a receptacle for molten glass having a discharge outlet passage in its bottom wall,
   b. stirring means for said molten glass including a plurality of cooperative segmental sections arranged in a circle around and in spaced relationship with respect to said discharge passage,
   c. a fluid overlying and protecting the bottom wall of said receptacle from currents of molten glass induced by said stirring means, said fluid being heavier than molten glass, and
   d. a curb around the upper end of said passage extending upwardly from the bottom wall of said receptacle defining a retaining wall to prevent flow of said protective fluid into said discharge passage.

17. Apparatus as defined in claim 16 which further includes container means interposed between said receptacle and said protective fluid to contain said fluid.

18. Apparatus as defined in claim 16 which further includes
   a. a reciprocal charge shape controlling plunger projecting into molten glass above said outlet, and
   b. a charge weight controlling sleeve surrounding said plunger having a lower end disposed in said molten glass in flow regulating relation to said retaining curb,
   c. said segmental sections of said stirrer being arranged around said sleeve and rotatable around the circle defined thereby with their bottom portions closely adjacent said protective fluid to mix molten glass flowing from said receptacle into the opening between said sleeve and curb and then out said outlet in response to plunger operation.

19. Apparatus as defined in claim 16 in which said stirrer extends downwardly into said protective fluid.

20. Apparatus as defined in claim 19 in which the portion of said stirrer in said fluid forms an annular structure and in which said segments extend upwardly from said annular structure from just above the surface of said protective fluid.

21. A method for thoroughly mixing molten glass flowing in a refractory receptacle, comprising
   a. immersing a stirring means in said molten glass with molten glass engaging and circulating means disposed closely adjacent wall means of the receptacle,
   b. interposing protective shielding directly below said stirring means and the refractory wall means of said receptacle to prevent erosion of said refractory, and
   c. driving said stirring means to remove relatively viscous and cooler molten glass from adjacent the wall means closely adjacent to the stirring means to mix and blend such glass with hotter, less viscous glass away from the wall means of the receptacle.

22. A method for thoroughly mixing molten glass flowing in a refractory receptacle, comprising
   a. immersing a stirring means in said molten glass with molten glass engaging and circulating means disposed closely adjacent wall means of the receptacle,
   b. interposing protective shielding between said stirring means and the refractory of said receptacle to prevent erosion of said refractory,
   c. driving said stirring means to remove relatively viscous and cooler molten glass from adjacent the wall means to mix and blend such glass with hotter, less viscous glass away from the wall means of the receptacle,
   d. disposing said stirring means closely adjacent a bottom wall of said receptacle, and
   retaining a pool of protective fluid as protective shielding having a density greater than the molten glass between said stirring means and said refractory.

23. A method as defined in claim 22 which further includes melting a metal having a boiling temperature higher than the temperature of said molten glass to form said pool of protective fluid.

24. A method as defined in claim 22 which further includes interposing container means between the pool and the refractory to retain said pool in protective disposition between said stirring means and said refractory.

* * * * *